US012646644B2

(12) United States Patent
Tache

(10) Patent No.: US 12,646,644 B2
(45) Date of Patent: Jun. 2, 2026

(54) VEHICLE PANEL CLOSURE WITH ELECTRO PERMANENT MAGNET

(71) Applicant: GM Global Technology Operations LLC, Detroit, MI (US)

(72) Inventor: Oscar Tache, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 783 days.

(21) Appl. No.: 17/868,362

(22) Filed: Jul. 19, 2022

(65) Prior Publication Data

US 2024/0026713 A1     Jan. 25, 2024

(51) Int. Cl.

| | |
|---|---|
| *B60K 15/05* | (2006.01) |
| *E05B 81/72* | (2014.01) |
| *E05B 83/34* | (2014.01) |
| *G07C 9/00* | (2020.01) |
| *H01F 7/02* | (2006.01) |
| *H01F 7/06* | (2006.01) |

(52) U.S. Cl.
CPC .......... *H01F 7/0263* (2013.01); *E05B 81/72* (2013.01); *G07C 9/00182* (2013.01); *H01F 7/064* (2013.01); *B60K 2015/0561* (2013.01); *E05B 83/34* (2013.01); *G07C 2009/00206* (2013.01); *G07C 2009/00984* (2013.01)

(58) Field of Classification Search
CPC ...... H01F 7/0263; H01F 7/0242; E05B 81/08; E05B 83/34; B60K 2015/0561; B60K 2015/0569; B60K 2015/0576

USPC ....................................................... 296/97.22
See application file for complete search history.

(56) References Cited

U.S. PATENT DOCUMENTS

| | | | | |
|---|---|---|---|---|
| 5,664,811 A | * | 9/1997 | Martus | B60K 15/05 |
| | | | | 292/144 |
| 7,185,938 B2 | * | 3/2007 | Beck | B60K 15/05 |
| | | | | 292/207 |
| 8,539,990 B2 | * | 9/2013 | Ferguson | F01M 11/0458 |
| | | | | 292/144 |
| 8,720,968 B2 | * | 5/2014 | Zalan | B60L 53/16 |
| | | | | 296/97.22 |
| 9,963,921 B1 | * | 5/2018 | Kamkar | G07C 9/00174 |
| 2005/0194810 A1 | * | 9/2005 | Beck | B60K 15/05 |
| | | | | 296/97.22 |
| 2011/0175376 A1 | * | 7/2011 | Whitens | E05C 19/166 |
| | | | | 292/251.5 |
| 2013/0020144 A1 | * | 1/2013 | Troy | B25J 5/007 |
| | | | | 280/446.1 |
| 2013/0076059 A1 | * | 3/2013 | Zalan | B60L 53/16 |
| | | | | 49/386 |

(Continued)

*Primary Examiner* — Gregory A Blankenship
(74) *Attorney, Agent, or Firm* — CANTOR COLBURN LLP

(57) ABSTRACT

A system in a vehicle includes a panel configured cover a portion of the vehicle through which a port extends and one or more electro permanent magnets arranged on the portion of the vehicle. The system also includes a controller to magnetize the one or more electro permanent magnets based on applying a current of a first polarity to the one or more electro permanent magnets such that the one or more electro permanent magnets on the portion of the vehicle couple to the panel, the panel being metal, or to one or more permanent magnets on a surface of the panel to lock the panel when the panel is in the closed position.

18 Claims, 3 Drawing Sheets

(56) References Cited

U.S. PATENT DOCUMENTS

| | | | | |
|---|---|---|---|---|
| 2016/0375762 A1* | 12/2016 | Lee | ..................... | B60K 15/05 |
| | | | | 296/97.22 |
| 2017/0092401 A1* | 3/2017 | Herman | ............... | H01F 7/0252 |
| 2017/0259785 A1* | 9/2017 | Lovett | .................... | E05B 81/04 |
| 2018/0105036 A1* | 4/2018 | Guardianelli | ........... | E05B 81/16 |
| 2018/0219552 A1* | 8/2018 | Casparian | .............. | H01F 7/204 |
| 2019/0186181 A1* | 6/2019 | Robertson | ............ | H01F 7/1646 |
| 2019/0315479 A1* | 10/2019 | Tillotson | ................ | H02J 7/342 |
| 2020/0392759 A1* | 12/2020 | Morrison | .............. | G06F 1/1607 |
| 2021/0071454 A1* | 3/2021 | Baldovino | ........... | E05C 19/166 |
| 2021/0174995 A1* | 6/2021 | Fiaz | ..................... | H01F 7/0252 |
| 2022/0020517 A1* | 1/2022 | Holung | ................ | G06F 1/1654 |
| 2022/0136321 A1* | 5/2022 | Hoezee | .................. | E06B 3/485 |
| | | | | 49/31 |
| 2022/0212638 A1* | 7/2022 | Georgeson | .............. | G05D 1/12 |
| 2022/0242594 A1* | 8/2022 | Ekblaw | ............. | G01R 33/0385 |
| 2023/0316833 A1* | 10/2023 | Niegmann | ......... | G07C 9/00309 |
| | | | | 340/5.61 |
| 2024/0026713 A1* | 1/2024 | Tache | .................. | H01F 7/0263 |
| 2024/0037941 A1* | 2/2024 | Miller-Smith | ....... | G06V 10/762 |

* cited by examiner

VEHICLE PANEL CLOSURE WITH ELECTRO PERMANENT MAGNET

INTRODUCTION

The subject disclosure relates to a vehicle panel closure with an electro permanent magnet.

Vehicles (e.g., automobiles, trucks, motorcycles, farm equipment, automated factory equipment, construction equipment) may include ports for fueling, recharging, or other purposes. These ports are typically covered by a hinged panel that facilitates easy access to the port. Accordingly, it is desirable to provide a vehicle panel closure with an electro permanent magnet.

SUMMARY

In one exemplary embodiment, a system in a vehicle includes a to cover a portion of the vehicle through which a port extends and one or more electro permanent magnets arranged on the portion of the vehicle. The system also includes a controller to magnetize the one or more electro permanent magnets based on applying a current of a first polarity to the one or more electro permanent magnets such that the one or more electro permanent magnets on the portion of the vehicle couple to the panel, which is metal, or to one or more permanent magnets on a surface of the panel to lock the panel when the panel is in the closed position.

In addition to one or more of the features described herein, the controller demagnetizes the one or more electro permanent magnets based on applying a current of a second polarity to the one or more electro permanent magnets to decouple the one or more electro permanent magnets from the panel or the one or more permanent magnets to unlock the panel.

In addition to one or more of the features described herein, the controller demagnetizes the one or more electro permanent magnets based on detecting an unlock condition.

In addition to one or more of the features described herein, the unlock condition is actuation of a button on a key fob or implementation of an application on a smartphone or computer.

In addition to one or more of the features described herein, the unlock condition is unlocking of the vehicle.

In addition to one or more of the features described herein, the controller magnetizes the one or more electro permanent magnets based on detecting a lock condition.

In addition to one or more of the features described herein, the lock condition is actuation of a button on a key fob or implementation of an application on a smartphone or computer.

In addition to one or more of the features described herein, the lock condition is locking of the vehicle.

In addition to one or more of the features described herein, the panel is attached to the vehicle via a hinge.

In addition to one or more of the features described herein, the panel includes a mechanical closure.

In another exemplary embodiment, a method of assembling a system in a vehicle includes arranging a panel to cover a portion of the vehicle through which a port extends and arranging one or more electro permanent magnets on the portion of the vehicle. The method also includes configuring a controller to magnetize the one or more electro permanent magnets based on applying a current of a first polarity to the one or more electro permanent magnets such that the one or more electro permanent magnets on the portion of the vehicle couple to the panel, which is metal, or to one or more permanent magnets on a surface of the panel to lock the panel when the panel is in the closed position.

In addition to one or more of the features described herein, the configuring the controller includes the controller demagnetizing the one or more electro permanent magnets based on applying a current of a second polarity to the one or more electro permanent magnets to decouple the one or more electro permanent magnets from the panel or the one or more permanent magnets to unlock the panel.

In addition to one or more of the features described herein, the configuring the controller includes the controller demagnetizing the one or more electro permanent magnets based on detecting an unlock condition.

In addition to one or more of the features described herein, the detecting the unlock condition includes detecting actuation of a button on a key fob or implementation of an application on a smartphone or computer.

In addition to one or more of the features described herein, the detecting the unlock condition includes detecting unlocking of the vehicle.

In addition to one or more of the features described herein, the configuring the controller includes the controller magnetizing the one or more electro permanent magnets based on detecting a lock condition.

In addition to one or more of the features described herein, the detecting the lock condition includes detecting actuation of a button on a key fob or implementation of an application on a smartphone or computer.

In addition to one or more of the features described herein, the detecting the lock condition includes detecting locking of the vehicle.

In addition to one or more of the features described herein, the arranging the panel includes attaching the panel to the vehicle via a hinge.

In addition to one or more of the features described herein, the method also includes arranging a mechanical closure on the panel.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
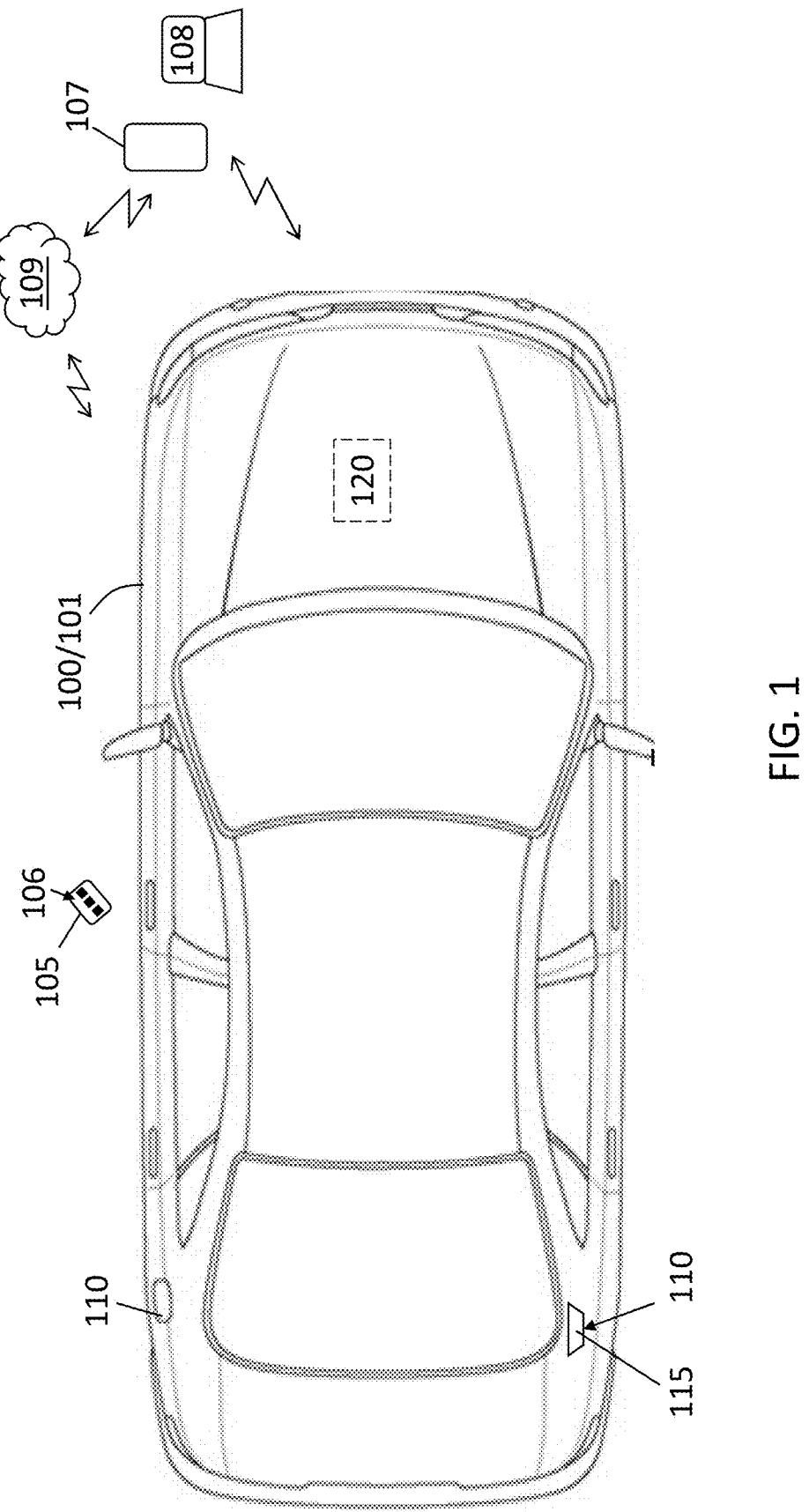
FIG. 1 is a block diagram of a vehicle that includes an electro permanent magnet to secure a panel according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a vehicle panel closure with an electro permanent magnet. As previously noted, vehicles may include one or more ports. These ports are generally used for repetitive tasks such as refueling, recharging, and the like. A hinged panel is typically used to provide easy access to a port while protecting the port from the environment when not in use. Generally, a mechanical latch may be located on a side of the panel opposite the hinge to release or secure the panel. For larger panels and/or under some circumstances, the single mechanical latch may be insufficient. For example, during manufacturing (e.g., the paint bake process) or at high speeds, it may be important to ensure that there are no gaps in the contact between the vehicle frame and the panel. As detailed, one or more electro permanent magnets may be used to secure the panel to the vehicle frame at different areas of the perimeter of the panel.

Figure 2:
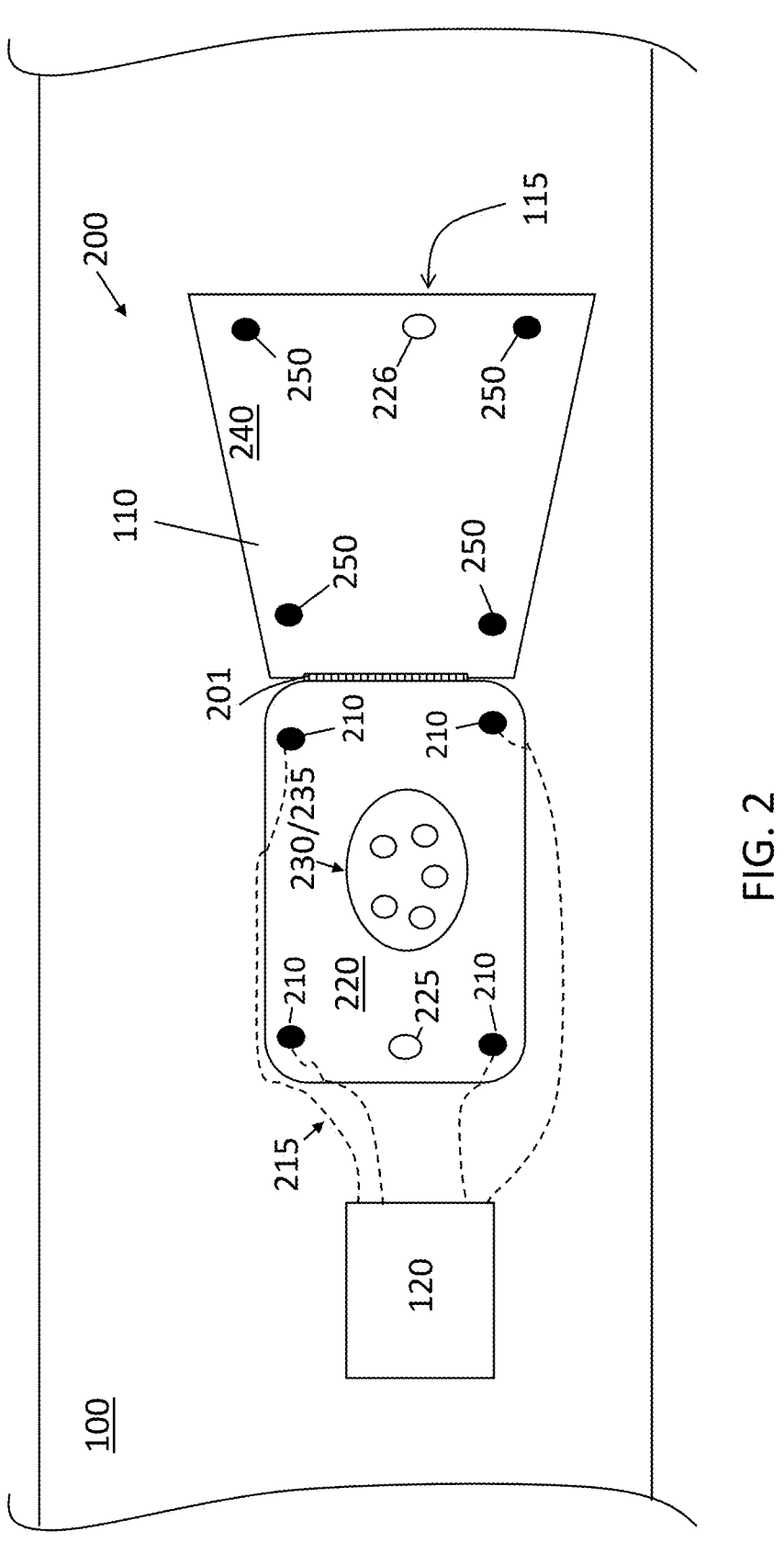
FIG. 2 shows a panel closure system in a vehicle according to one or more embodiments.

In accordance with an exemplary embodiment, FIG. 1 is a block diagram of a vehicle 100 that includes an electro permanent magnet 210 (FIG. 2) to secure a panel 110. The exemplary vehicle 100 shown in FIG. 1 is an automobile 101 and, more particularly, a plug-in hybrid. Thus, two exemplary panels 110 are shown in FIG. 1. One may cover a port 230 (FIG. 2) that is a gas refueling port. Another, with the outer surface 115 labeled, may cover a port 230 that is a charging port 235 (FIG. 2). In another type of vehicle 100 (e.g., all-electric, non-plug-in hybrid, gas-only), only one port 230 and corresponding panel 110 may be present.

The vehicle 100 and/or panel 110 may be locked/unlocked in a number of ways. The examples discussed herein are not intended to limit other devices or applications that may lock/unlock the vehicle 100 and/or panel 110. A key fob 105 is shown with buttons 106 that may be used to unlock/lock the vehicle 100 and/or unlock one or more panels 110. A smartphone 107 and computer 108 are also shown. These devices may communication with the vehicle 100 directly or via a cloud-based server 109, for example. The smartphone 107 or computer 108 may implement an application that locks/unlocks the vehicle 100 and/or one or more panels 110.

FIG. 1 also indicates a controller 120. The controller 120 may control various aspects of operation of the vehicle 100 and may also control securing and opening of the panels 110 as further discussed with reference to FIG. 2. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 120 may include memory in the form of a non-transitory computer-readable medium that stores instructions that are processed by one or more processors of the controller 120 to implement the processes discussed with reference to FIG. 3.

FIG. 2 shows a panel closure system 200 in a vehicle 100 according to one or more embodiments. In the exemplary panel closure system 200 shown in FIG. 2, the panel 110 is attached to the vehicle 100 via hinge 201. In alternate embodiments, the panel 110 may not be attached to the vehicle 100 when uncovered or may include two smaller hinges 201, for example. An exemplary port 230 that is a charging port 235 is shown exposed based on a panel 110 being open in FIG. 2. That is, the port 230 and vehicle frame 220 through which the port 230 extends are visible. The vehicle frame 220 is a term used for explanatory purposes to describe the portion of the vehicle 100 that is covered by the panel 110.

Four electro permanent magnets 210 are shown arranged around the vehicle frame 220 that is covered by the panel 110. Wires 215 from these electro permanent magnets 210 are shown coupled to the controller 120. A mechanical closure first part 225 is also indicated on the vehicle frame 220. A typical vehicle panel closure may only include this mechanical closure first part 225 and corresponding mechanical closure second part 226 (e.g., compression spring and latch arm).

An electro permanent magnet 210 is a known hybrid of a permanent magnet, which has a permanent or inherent magnetic field, and an electro magnet, in which a magnetic field is produced by an electric current. Unlike an electro magnet, electricity is not needed to maintain the magnetic field. Instead, a current pulse of one polarity magnetizes the electro permanent magnet 210 and a current pulse of the opposite polarity reverses the magnetization. More specifically, the electro permanent magnet 210 may include two magnetic materials (e.g., one magnetically hard, such as neodymium-iron-boron (Nd—Fe—B), and one semi-hard, such as Alnico). One current pulse may magnetize the magnetically hard and semi-hard materials together while the other current pulse reverses the magnetization of only the semi-hard material, thereby reducing the external magnetic flux.

As indicated, the outer surface 115 of the panel 110, which is visible as in FIG. 1 when the panel 110 is closed, is not visible in FIG. 2. Instead, the inner surface 240 of the panel 110, which faces the vehicle frame 220 when the panel 110 is closed, is visible in FIG. 2. Permanent magnets 250 are shown on the inner surface 240. These permanent magnets 250 are optional according to an exemplary embodiment. Each of these permanent magnets 250 corresponds with one of the electro permanent magnets 210 on the vehicle frame 220. That is, when the panel 110 is closed, each of the permanent magnets 250 contacts one of the electro permanent magnets 210. While four electro permanent magnets 210 and corresponding four permanent magnets 250 are shown in FIG. 2 for explanatory purposes, any number of pairs of electro permanent magnets 210 and corresponding permanent magnets 250 may be arranged around the vehicle frame 220 and the inner surface 240 of the panel 110. A larger number of pairs of electro permanent magnets 210 and corresponding permanent magnets 250 may be needed based on a larger panel 110, for example.

While permanent magnets 250 arranged on the inner surface 240 of the panel 110 are shown as one exemplary embodiment, the panel 110 itself may be magnetic according to an alternate embodiment. That is, the panel 110 or inner surface 240, specifically, may be magnetic (e.g., a metal). In this case, the electro permanent magnets 210 may be long enough to contact the inner surface 240 of the panel 110 when it is closed. As a further alternative, protrusions, at locations indicated for the permanent magnets 250, may extend from the inner surface 240 of the panel 110 to contact the electro permanent magnets 210 when the panel 110 is closed.

When the electro permanent magnets 210 are magnetized, based on a current pulse sent over the wires 215, each electro permanent magnet 210 is attracted to its corresponding permanent magnet 250 (or the magnetic panel 110). This results in a tight seal around the perimeter of the panel 110. When the electro permanent magnets 210 are demagnetized, based on a current pulse of an opposite polarity being sent over the wires 215, then the electro permanent magnets 210 and permanent magnets 250 (or panel 110) are not coupled, and the panel 110 may be opened based on the mechanical closure first and second parts 225, 226. The current pulses may be applied by aspects of the controller 120, as shown, or based on control signals provided by the controller 120.

In addition, current to each of the electro permanent magnets 210 may be controlled individually by the controller 120 such that all of the electro permanent magnets 210 need not be magnetized or demagnetized together.

Figure 3:
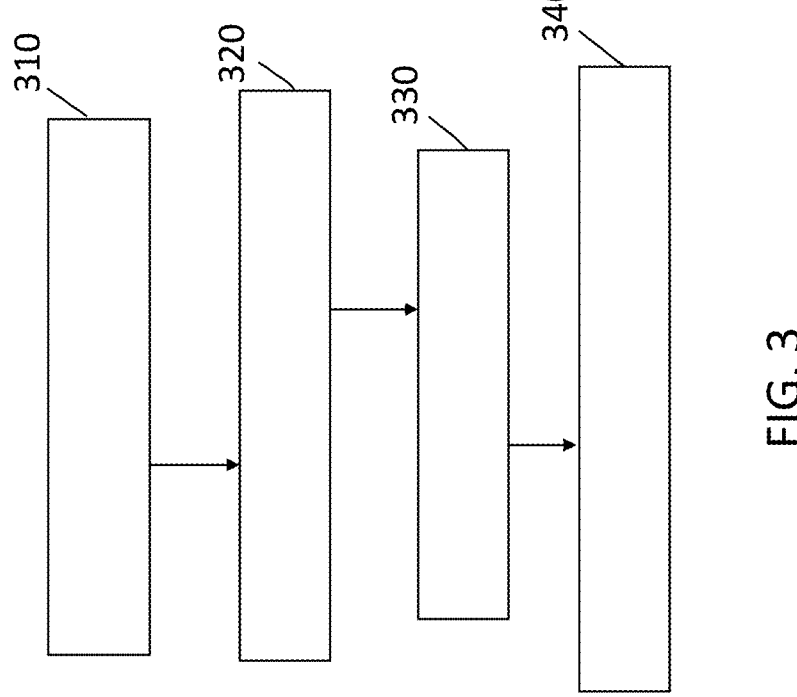
FIG. 3 is a process flow of a method of controlling a panel closure system in a vehicle according to one or more embodiments.

FIG. 3 is a process flow of a method 300 of controlling a panel closure system 200 in a vehicle 100 according to one or more embodiments. The processes shown in FIG. 1 may be performed by the controller 120 alone or in conjunction with additional processing circuitry of the vehicle 100. For explanatory purposes, the initial state of the vehicle 100 may be regarded as one with the panel 110 closed and the electro permanent magnets 210 coupled to the permanent magnets 250 (or panel 110) for a tight seal around the perimeter of the panel 110.

At block 310, detecting an unlock condition refers to detecting one of several actions that may indicate a permissible opening of the panel 110. For example, a button 106 on a key fob 105 for the vehicle 100 may be actuated to indicate that the panel 110 should be unlocked. Additionally or alternately, unlocking the vehicle 100 may also indicate an unlock condition for the panel 110. Any action that is mapped to an unlock condition at the controller 120 may be detected at block 310 to indicate the permissible opening of the panel 110.

At block 320, a current of a first polarity is triggered when the unlock condition is detected at block 310. In addition, the unlock condition (at block 310) may also release the mechanical closure first part 225 from the corresponding mechanical closure second part 226 when those are additionally present. When the current of the first polarity is applied to the electro permanent magnets 210 via the wires 215, the electro permanent magnets 210 are demagnetized, releasing them from the permanent magnets 250 (or panel 110). As a result, the panel 110 may be opened.

At block 330, detecting a lock condition refers to detecting one of several actions that may indicate that the panel 110 should be locked and not permitted to be opened. The detection of this condition does not require the panel 110 to be closed but, instead, indicates that, when the panel 110 is closed, it will be locked. For example, a button 106 on a key fob 105 for the vehicle 100 may be actuated to indicate that the panel 110 should be locked. Additionally or alternately, locking the vehicle 100 may also indicate a lock condition for the panel 110. Any action may be mapped to a lock condition at the controller 120.

At block 340, a current of a second polarity, opposite the first polarity, is triggered when the lock condition is detected at block 330. In addition, the lock condition (at block 330) may cause the mechanical closure first part 225 to couple with the corresponding mechanical closure second part 226 when those are additionally present and the panel 110 is closed. When the current of the second polarity is applied to the electro permanent magnets 210 via the wires 215, the electro permanent magnets 210 are magnetized, causing them to couple to the permanent magnets 250 (or panel 110) when the panel 110 is closed. The processes shown in FIG. 3 may be repeated each time a change in condition is detected at block 310 or block 330.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
   a panel configured to cover a portion of the vehicle through which a port extends;
   one or more electro permanent magnets arranged on the portion of the vehicle;
   one or more permanent magnets arranged on a surface of the panel that faces the portion, each of the one or more permanent magnets being aligned with one of the one or more electro permanent magnets when the panel is in a closed position; and
   a controller configured to magnetize the one or more electro permanent magnets based on applying a first current of a first polarity to the one or more electro permanent magnets such that the one or more electro permanent magnets on the portion of the vehicle couple to the one or more permanent magnets on the surface of the panel to lock the panel when the panel is in the closed position; and
   wherein the controller is configured to demagnetize the one or more electro permanent magnets based on applying a second current of a second polarity to the one or more electro permanent magnets, and wherein the panel is detached from the vehicle while the one or more electro permanent magnets are demagnetized.

2. The system according to claim 1, wherein the controller is configured to demagnetize the one or more electro permanent magnets based on applying a current of a second polarity to the one or more electro permanent magnets to decouple the one or more electro permanent magnets from the one or more permanent magnets to unlock the panel.

3. The system according to claim 2, wherein the controller is configured to demagnetize the one or more electro permanent magnets based on detecting an unlock condition.

4. The system according to claim 3, wherein the unlock condition is actuation of a button on a key fob or implementation of an application on a smartphone or computer.

5. The system according to claim 3, wherein the unlock condition is unlocking of the vehicle.

6. The system according to claim 1, wherein the controller is configured to magnetize the one or more electro permanent magnets based on detecting a lock condition.

7. The system according to claim 6, wherein the lock condition is actuation of a button on a key fob or implementation of an application on a smartphone or computer.

8. The system according to claim 6, wherein the lock condition is locking of the vehicle.

9. The system according to claim 1, wherein the panel includes a mechanical closure.

10. A method of assembling a system in a vehicle, the method comprising:
   arranging a panel to cover a portion of the vehicle through which a port extends;
   arranging one or more electro permanent magnets on the portion of the vehicle;
   arranging one or more permanent magnets on a surface of the panel that faces the portion such that each of the one or more permanent magnets is aligned with one of the one or more electro permanent magnets when the panel is in a closed position; and
   configuring a controller to magnetize the one or more electro permanent magnets based on applying a current of a first polarity to the one or more electro permanent magnets such that the one or more electro permanent magnets on the portion of the vehicle couple to the one or more permanent magnets on the surface of the panel to lock the panel when the panel is in the closed position; and configuring the controller to demagnetize the one or more electro permanent magnets based on applying a second current of a second polarity to the one or more electro permanent magnets, and wherein the panel is detached from the vehicle while the one or more electro permanent magnets are demagnetized.

11. The method according to claim 10, wherein the configuring the controller includes the controller demagnetizing the one or more electro permanent magnets based on applying a current of a second polarity to the one or more electro permanent magnets to decouple the one or more electro permanent magnets from the one or more permanent magnets to unlock the panel.

12. The method according to claim 11, wherein the configuring the controller includes the controller demagnetizing the one or more electro permanent magnets based on detecting an unlock condition.

13. The method according to claim 12, wherein the detecting the unlock condition includes detecting actuation of a button on a key fob or implementation of an application on a smartphone or computer.

14. The method according to claim 12, wherein the detecting the unlock condition includes detecting unlocking of the vehicle.

15. The method according to claim 10, wherein the configuring the controller includes the controller magnetizing the one or more electro permanent magnets based on detecting a lock condition.

16. The method according to claim 15, wherein the detecting the lock condition includes detecting actuation of a button on a key fob or implementation of an application on a smartphone or computer.

17. The method according to claim 15, wherein the detecting the lock condition includes detecting locking of the vehicle.

18. The method according to claim 10, further comprising arranging a mechanical closure on the panel.

* * * * *